United States Patent
Zhou et al.

(10) Patent No.: US 11,330,568 B2
(45) Date of Patent: May 10, 2022

(54) UPLINK CONTROL INFORMATION TRANSMITTING METHOD, DEVICE, STORAGE MEDIUM, AND USER EQUIPMENT

(71) Applicant: Beijing Spreadtrum Hi-Tech Communications Technology Co., Ltd., Beijing (CN)

(72) Inventors: Huan Zhou, Beijing (CN); Zhikun Xu, Beijing (CN); Yun Deng, Beijing (CN)

(73) Assignee: Beijing Spreadtrum Hi-Tech Communications Tech, Beijing (CN)

( * ) Notice: Subject to any disclaimer, the term of this patent is extended or adjusted under 35 U.S.C. 154(b) by 0 days.

(21) Appl. No.: 16/321,399

(22) PCT Filed: Jan. 21, 2019

(86) PCT No.: PCT/CN2019/072507
§ 371 (c)(1),
(2) Date: Feb. 7, 2020

(87) PCT Pub. No.: WO2019/154051
PCT Pub. Date: Aug. 15, 2019

(65) Prior Publication Data
US 2021/0337532 A1    Oct. 28, 2021

(30) Foreign Application Priority Data

Feb. 12, 2018    (CN) .......................... 201810146718.X

(51) Int. Cl.
*H04W 72/04*    (2009.01)
*H04L 5/00*    (2006.01)

(52) U.S. Cl.
CPC ....... *H04W 72/0413* (2013.01); *H04L 5/0053* (2013.01)

(58) Field of Classification Search
CPC .......................... H04W 72/0413; H04L 5/0053
See application file for complete search history.

(56) References Cited

U.S. PATENT DOCUMENTS

| 9,295,012 B2* | 3/2016 | Kim ................... H04W 52/346 |
| 2016/0183244 A1* | 6/2016 | Papasakellariou .... H04L 5/0057 370/329 |

(Continued)

FOREIGN PATENT DOCUMENTS

| CN | 101989904 A | 3/2011 |
| CN | 104853438 A | 8/2015 |

(Continued)

OTHER PUBLICATIONS

The State Intellectual Property Office of the People's Republic of China, First Office Action for Chinese Patent Application No. 201810146718.X.

(Continued)

*Primary Examiner* — Duc C Ho
(74) *Attorney, Agent, or Firm* — Womble Bond Dickinson (US) LLP

(57) ABSTRACT

Provided are a transmitting method and a transmitting device for uplink control information, a storage medium, and a user equipment. The transmitting method includes: receiving PUCCH resource assignment information sent from a network to determine a PUCCH format and assigned resource blocks; and resource mapping the uplink control information at least based on all frequency domain resources of the assigned resource blocks, if the determined PUCCH format is one that requires more than one physical resource block for resource transmission and a number of the assigned resource blocks is larger than that required for transmitting the uplink control information. With the technical solution provided in the present disclosure, when the uplink control information is transmitted in unlicensed spec- (Continued)

trums in a PUCCH format requiring more than one physical resource block for resource transmission, the occupation ratio of the uplink power in unlicensed spectrums can be significantly improved.

13 Claims, 4 Drawing Sheets

(56) References Cited

U.S. PATENT DOCUMENTS

2017/0164352 A1    6/2017  Yang et al.
2017/0310429 A1* 10/2017  Wang ................ H04W 72/0413

FOREIGN PATENT DOCUMENTS

| | | |
|---|---|---|
| CN | 107241802 A | 10/2017 |
| CN | 107409114 A | 11/2017 |
| CN | 107683575 A | 2/2018 |
| CN | 107683576 A | 2/2018 |
| WO | 2017051726 A1 | 3/2017 |

OTHER PUBLICATIONS

International Search report for International Application No. PCT/CN2019/072507, dated Jan. 28, 2019.

* cited by examiner

UPLINK CONTROL INFORMATION TRANSMITTING METHOD, DEVICE, STORAGE MEDIUM, AND USER EQUIPMENT

This application is a U.S. national stage application of the PCT International Application No. PCT/CN2019/072507 filed on Jan. 21, 2019, which claims the benefit of foreign priority of Chinese patent application No. 201810146718.X filed on Feb. 12, 2018, the contents all of which are incorporated herein by reference.

TECHNICAL FIELD

The present disclosure relates to the field of wireless communication technologies, and specifically to a transmitting method and a transmitting device for uplink control information, a storage medium, and a user equipment.

BACKGROUND

In the 3GPP new radio (NR) system, a physical uplink control channel (PUCCH) can carry uplink control information (UCI). During the communication, if a user equipment (UE) is not scheduled, that is, when the network does not assign an uplink shared channel (UL-SCH) resource to the UE, the UE may utilize PUCCH to transmit physical layer/media access control layer (L1/L2) control information that may include a hybrid automatic repeat request (HARQ) acknowledgement (i.e., ACK/NACK), a schedule request, a channel state report, and the likes. The channel state report may include a precoding matrix indicator (PMI), a channel quality indicator (CQI), a rank indication (RI), etc.

Currently, the 3GPP standard organization is studying on the deployment of the NR system in unlicensed spectrums, for the purpose of an efficient usage of the unlicensed spectrums and an improved data transmitting rate of the NR system. There are three ways for the NR system to use the unlicensed spectrums. The first way is to use an NR cell in an unlicensed spectrum as a main cell; the second way is to have a UE accessing an NR cell in an unlicensed spectrum via a long term evaluation (LTE) cell in a licensed spectrum; and the third way is to have a UE accessing an NR cell in an unlicensed spectrum via an NR cell in a licensed spectrum. In the second and third ways, the UE and the NR base station (also referred to as gNB) or the evolved node B (eNB) may work simultaneously in both the licensed spectrum and the unlicensed spectrum by the carrier aggregation technology.

However, it is required in the European region that the occupation ratio in the uplink power transmitted based on unlicensed spectrums must be greater than 80%. Referring to FIG. 1, in LTE unlicensed assisted access, the UL-SCH and the PUCCH may be transmitted in an interlacing manner to meet the requirement. For example, in the case where the transmission bandwidth is 20 MHz and 100 physical resource blocks (PRBs) are contained, the eNB in LTE network assigns 10 PRBs to the PUCCH resource, and the PUCCH can be distributed evenly in the frequency domain, and transmitted, e.g., by using resource blocks (RB) indexed as RB0, RB10, RB20, . . . RB90. In terms of the NR system, if the PUCCH resource assigned by the network gNB to the UE is one interlacing unit (e.g., one interlacing unit may include 10 PRBs), then the PUCCH format 0/1/4 occupying only one PRB can be transmitted repeatedly in the 10 assigned PRBs, to meet the requirement in the European region that the occupation ratio in the uplink power in unlicensed spectrums must be greater than 80%. Nevertheless, for PUCCH formats 2 and 3 requiring a plurality of PRB resources for transmission, if using the PUCCH uplink transmission scheme in licensed spectrums directly, it is impossible to meet the requirement in the European region that the occupation ratio in the uplink power in unlicensed spectrums must be greater than 80%.

To this end, the PUCCH resource assignment in unlicensed spectrums is required to be further studied.

SUMMARY

A technical problem to be solved by the present disclosure is how to transmit PUCCH formats requiring more than one PRB for resource transmission, e.g., PUCCH format 2, PUCCH format 3, in an unlicensed spectrum, to significantly improve the occupation ratio in the uplink transmission power.

In order to solve the above technical problem, an embodiment of the present disclosure provides a transmitting method for uplink control information, comprising: receiving PUCCH resource assignment information sent from a network to determine a PUCCH format and assigned resource blocks; and resource mapping the uplink control information at least based on all frequency domain resources of the assigned resource blocks if the determined PUCCH format is one that requires more than one physical resource block for resource transmission and a number of the assigned resource blocks is larger than that required for transmitting the uplink control information.

Alternatively, resource mapping the uplink control information at least based on all frequency domain resources of the assigned resource blocks comprises: calculating an actual code rate required to occupy all the assigned resource blocks; and mapping the uplink control information to the assigned resource blocks according to the actual code rate.

Alternatively, calculating the actual code rate required to occupy all the assigned resource blocks comprises: calculating available code rates when the determined PUCCH format occupies all the assigned resource blocks; and determining a minimum code rate among the available code rates as the actual code rate.

Alternatively, resource mapping the uplink control information at least based on all frequency domain resources of the assigned resource blocks comprises: mapping the uplink control information to the assigned resource blocks; and if there is still an idle resource block after the mapping, copying the uplink control information in the mapped resource block to the idle resource block sequentially with an order from a low resource block to a high resource block.

Alternatively, resource mapping the uplink control information at least based on all frequency domain resources of the assigned resource blocks comprises: if the number of the assigned resource blocks is larger than that required for transmitting the uplink control information, mapping the uplink control information to all subcarriers of all the assigned resource blocks firstly in frequency domain and then in time domain.

Alternatively, resource mapping the uplink control information at least based on all frequency domain resources of the assigned resource blocks comprises: for a resource block with an idle resource element, copying information on the mapped resource element in the resource block to the idle resource element in a time-domain sequence.

To solve the above technical problem, an embodiment of the present disclosure further provides a transmitting device for uplink control information, comprising: a receiving module, adapted to receive PUCCH resource assignment information sent from a network to determine a PUCCH format and assigned resource blocks; and a resource mapping module, adapted to resource mapping the uplink control information at least based on all frequency domain resources of the assigned resource blocks if the determined PUCCH format is one that requires more than one physical resource block for resource transmission and the number of the assigned resource blocks is larger than that required for transmitting the uplink control information.

Alternatively, the resource mapping module comprises: a calculation submodule adapted to calculate an actual code rate required to occupy all the assigned resource blocks; and a first mapping submodule adapted to map the uplink control information to the assigned resource blocks according to the actual code rate.

Alternatively, the calculation submodule includes: a calculation unit adapted to calculate available code rates when the determined PUCCH format occupies all the assigned resource blocks; and a determining unit adapted to determine a minimum code rate among the available code rates as the actual code rate.

Alternatively, the resource mapping module comprises: a second mapping submodule adapted to map the uplink control information to the assigned resource blocks; and a first copying submodule adapted to copy, if there is still an idle resource block after the mapping, the uplink control information in the mapped resource block to the idle resource block sequentially with an order from a low resource block to a high resource block.

Alternatively, the resource mapping module comprises: a third mapping submodule adapted to map the uplink control information to all subcarriers of all the assigned resource blocks firstly in frequency domain and then in time domain, if the number of the assigned resource blocks is larger than that required for transmitting the uplink control information.

Alternatively, the resource mapping module further comprises: a second copy submodule adapted to copy, for a resource blocks with an idle resource element, information in the mapped resource element in the resource block to the idle resource element in a time-domain sequence.

To solve the above-mentioned technical problem, an embodiment of the present disclosure further provides a storage medium storing computer instructions. The computer instructions, when executed by a computer, cause the computer to perform the steps of the transmitting method for uplink control information.

In order to solve the above-mentioned technical problem, an embodiment of the present disclosure further provides a user equipment, comprising a memory and a processor. The memory stores computer instructions executable by the processor to cause the processor perform the steps of the transmitting method for uplink control information.

Compared with the prior art, the technical solutions of embodiments in the present disclosure have the following advantages:

An embodiment of the present disclosure provides a transmitting method for uplink control information, comprising: firstly, receiving PUCCH resource assignment information sent from a network to determine assigned resource blocks; secondly, determining a PUCCH format for use; and finally, if the PUCCH format for use is one that requires more than one physical resource block for resource transmission and the number of the assigned resource blocks is larger than that required for transmitting the uplink control information, resource mapping the uplink control information at least based on all frequency domain resources of the assigned resource blocks. With the technical solution provided in the present disclosure, the occupation ratio in power of a PUCCH format requiring more than one physical resource block for resource transmission, such as PUCCH format 2 and PUCCH format 3, which is transmitted in an unlicensed spectrum, can be improved, for example, to meet the requirement in the European region that the occupation ratio in the uplink power in unlicensed spectrums must be greater than 80%, enabling the PUCCH to be transmitted in unlicensed spectrums in any country or region.

Furthermore, calculating an actual code rate required to occupy all the assigned resource blocks comprises: calculating available code rates when the PUCCH format for use occupies all the assigned resource blocks; and determining a minimum code rate among the available code rates as the actual code rate. By reducing the actual code rate for the PUCCH format requiring more than one physical resource block for resource transmission, such as PUCCH format 2 and PUCCH format 3, to transmit the uplink control information, the occupation ratio in power of the PUCCH format requiring more than one physical resource block for resource transmission, such as PUCCH format 2 and PUCCH format 3, which is transmitted in an unlicensed spectrum, can be significantly improved, meeting the requirement of a 80% occupation ratio in power.

DETAILED DESCRIPTION

Figure 1:
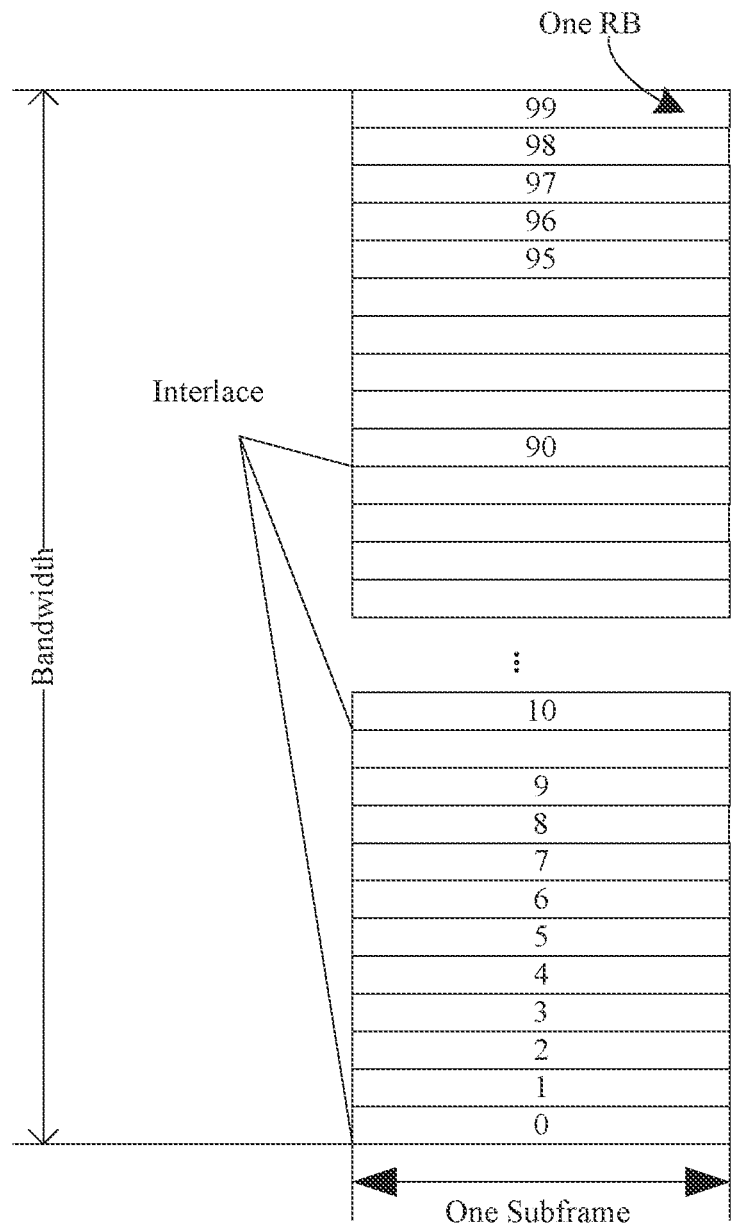
FIG. 1 is a schematic diagram of a resource mapping where a PUCCH is transmitted in an unlicensed spectrum according to an LTE technique in the prior art.

It is understandable to one of skill in the art that the PUCCH transmission scheme in prior art NR systems can hardly be used directly in unlicensed spectrums because of its inconformity to the requirement in Europe that the occupation ratio in the uplink power in unlicensed spectrums must be greater than 80%.

TABLE 1

| PUCCH Format | OFDM Symbol Length | Bit |
| --- | --- | --- |
| 0 | 1 to 2 | ≤2 |
| 1 | 4 to 12 | ≤2 |
| 2 | 1 to 2 | >2 |
| 3 | 4 to 12 | >2 |
| 4 | 4 to 12 | >2 |

The inventors have found that, different PUCCH formats can be used in the transmission of the uplink control information by PUCCH, and different PUCCH formats have different PUCCH parameters. As listed in Table 1, PUCCH format 1, PUCCH format 3 and PUCCH format 4 occupy larger numbers of the OFDM symbols. The numbers of PRBs used by PUCCH format 0, PUCCH format 1 and PUCCH format 4 are 1, while the numbers of PRBs used by PUCCH format 2 and PUCCH format 3 are greater than 1.

Since the number of PUCCH PRBs assigned by the network may be greater than that actually transmitted, in the case of transmitting data over licensed spectrums, if PUCCH resources are determined, UE can determine the number of RBs or PRBs required by PUCCH format 2 and PUCCH format 3 by the following steps.

As to PUCCH format 2, the assignment by network may be via high-layer signaling (e.g., radio resource control (RRC) signaling). It is assumed that the number of assigned RBs is $M_{RB}^{PUCCH}$.

If $$\begin{cases} (O_{ACK} + O_{SR} + O_{CSI} + O_{CRC}) \leq M_{RB,min}^{PUCCH} \cdot N_{sc,ctrl}^{RB} \cdot N_{symb}^{PUCCH} \cdot Q_m \cdot r \\ (O_{ACK} + O_{SR} + O_{CSI} + O_{CRC}) > (M_{RB,min}^{PUCCH} - 1) \cdot N_{sc,ctrl}^{RB} \cdot N_{symb}^{PUCCH} \cdot Q_m \cdot r \end{cases}$$

then UE may choose the minimum $M_{RB,min}^{PUCCH}$ which satisfies $$\begin{cases} (O_{ACK} + O_{SR} + O_{CSI} + O_{CRC}) \leq M_{RB,min}^{PUCCH} \cdot N_{sc,ctrl}^{RB} \cdot N_{symb}^{PUCCH} \cdot Q_m \cdot r \\ (O_{ACK} + O_{SR} + O_{CSI} + O_{CRC}) > (M_{RB,min}^{PUCCH} - 1) \cdot N_{sc,ctrl}^{RB} \cdot N_{symb}^{PUCCH} \cdot Q_m \cdot r \end{cases}$$

Wherein, $O_{ACK}$ is a total number of bits of HARQ acknowledgement; $O_{SR}$ is a bit for scheduling request, if there is no bit for scheduling request, $O_{SR}=0$, or else $O_{SR}=1$; $O_{CSI}$ is a total number of bits reported by CSI; $O_{CRC}$ is a total number of bits for cyclic redundancy check (CRC); $N_{sc,ctrl}^{RB}$ is the number of subcarriers contained in RB $N_{sc,ctrl}^{RB}=N_{sc}^{RB}-4=8$; $N_{symb}^{PUCCH}$ is the number of symbols in PUCCH format 2; $Q_m$ is a modulation order, and r is a code rate assigned by high-layer signaling.

TABLE 2

| Maximum Code Rate of PUCCH Format 2, PUCCH Format 3 | Code Rate r |
| --- | --- |
| 0 | 0.08 |
| 1 | 0.15 |
| 2 | 0.25 |
| 3 | 0.35 |
| 4 | 0.45 |
| 5 | 0.60 |
| 6 | 0.80 |
| 7 | Placeholder |

As to PUCCH format 3, it is still assumed that the number of RBs assigned by high-layer signaling is $M_{RB}^{PUCCH}$.

If $$\begin{cases} (O_{ACK} + O_{SR} + O_{CSI} + O_{CRC}) \leq M_{RB,min}^{PUCCH} \cdot N_{sc,ctrl}^{RB} \cdot N_{symb}^{PUCCH} \cdot Q_m \cdot r \\ (O_{ACK} + O_{SR} + O_{CSI} + O_{CRC}) > (M_{RB,min}^{PUCCH} - 1) \cdot N_{sc,ctrl}^{RB} \cdot N_{symb}^{PUCCH} \cdot Q_m \cdot r \end{cases}$$

then UE may choose the minimum $M_{RB,min}^{PUCCH}$ which satisfies $$\begin{cases} (O_{ACK} + O_{SR} + O_{CSI} + O_{CRC}) \leq M_{RB,min}^{PUCCH} \cdot N_{sc,ctrl}^{RB} \cdot N_{symb}^{PUCCH} \cdot Q_m \cdot r \\ (O_{ACK} + O_{SR} + O_{CSI} + O_{CRC}) > (M_{RB,min}^{PUCCH} - 1) \cdot N_{sc,ctrl}^{RB} \cdot N_{symb}^{PUCCH} \cdot Q_m \cdot r \end{cases}$$

Wherein, $N_{sc,ctrl}^{RB}$ is the number of subcarriers contained in RB, $N_{sc,ctrl}^{RB}=N_{sc}^{RB}=12$, $N_{symb}^{PUCCH}$ is the number of symbols in PUCCH format 3 other than DMRS; $Q_m$ is a modulation order; and r is a code rate assigned by high-layer signaling.

Wherein, the code rates r used by PUCCH format 2 and PUCCH format 3 can be selected from Table 2.

Inventors have thus found that when the number of assigned PUCCH RBs is greater than that actually required, excessive PRB resources will be idle in the PUCCH transmitting method in licensed spectrums. If the PUCCH transmitting method in licensed spectrums is directly applied to unlicensed spectrums, the requirement on 80% occupation ratio in power cannot be satisfied.

An embodiment of the present disclosure provides a transmitting method for uplink control information, comprising: firstly, receiving PUCCH resource assignment information sent from a network to determine assigned resource blocks; secondly, determining a PUCCH format for use; and finally, if the PUCCH format for use is one that requires more than one physical resource block for resource transmission, which can be PUCCH format 2 or PUCCH format 3 or a PUCCH format with other forms of name, and the number of the assigned resource blocks is larger than that required for transmitting the uplink control information, resource mapping the uplink control information at least based on all frequency domain resources of the assigned resource blocks. With the technical solution provided in the present disclosure, the occupation ratio in power of a PUCCH format requiring more than one physical resource block for resource transmission, such as PUCCH format 2 and PUCCH format 3, which is transmitted in an unlicensed spectrum, can be improved, for example, to meet the requirement in the European region that the occupation ratio in the uplink power in unlicensed spectrums must be greater than 80%, enabling the PUCCH to be transmitted in unlicensed spectrums in any country or region.

Embodiments of the present disclosure will be detailed below with reference to the accompanying drawings, so that the above objects, features and advantages of the present disclosure are more lucid.

When only one RB is occupied by UCI, resource mapping may be performed in an interlacing manner similar to the PUCCH, or PUCCH is transmitted repeatedly in frequency domain, to meet the requirement in Europe on the power transmission over unlicensed spectrums. This can be implemented by referring to the technical solutions concerning a resource mapping method of transmitting PUCCH in unlicensed spectrums according to a LTE technique in the portion of Background, and will not be repeated.

Figure 2:
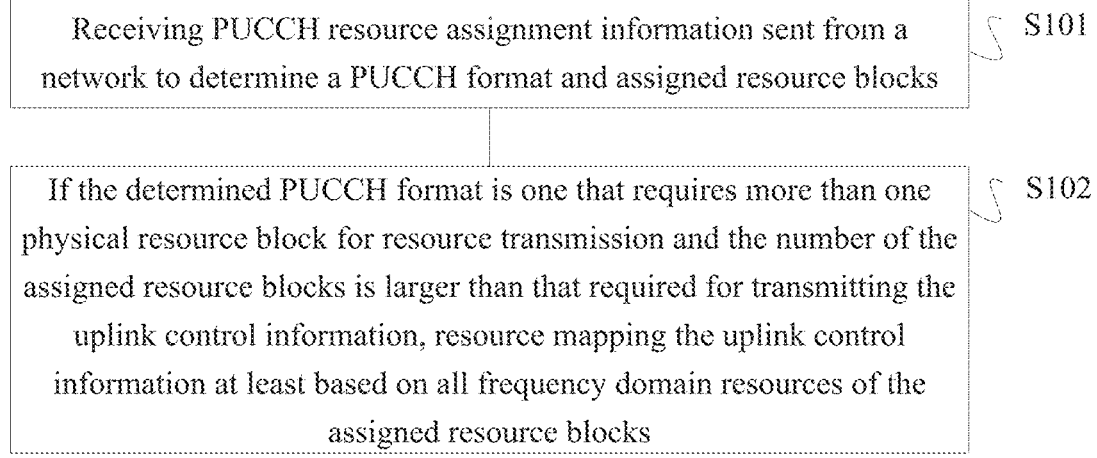
FIG. 2 is a schematic flow chart of the transmitting method for uplink control information according to an embodiment of the present disclosure.

When UCI occupies two or more RBs, the technical solution regarding the method of resource mapping of PUCCH as shown in FIG. 2 may be adopted.

Now refer to FIG. 2. FIG. 2 is a schematic flow chart of the transmitting method for uplink control information according to an embodiment of the present disclosure, which is applicable on the UE side.

To be specific, the transmitting method for uplink control information comprises:

step S101: receiving PUCCH resource assignment information sent from a network to determine a PUCCH format and assigned resource blocks; and step S102: if the determined PUCCH format is one that requires more than one physical resource block for resource transmission and the number of the assigned resource blocks is larger than that required for transmitting the uplink control information, resource mapping the uplink control information at least based on all frequency domain resources of the assigned resource blocks.

More specifically, in the NR system, each radio frame has a length in time domain of 10 milliseconds (ms), and each radios frame can be divided evenly into 10 subframes of 1 ms. Due to different spaces between subcarriers, each subframe may contain multiple slots. Each slot consists of a particular amount of time domain symbols, and the number of the time domain symbols may depend on the type of cyclic prefix (CP).

In step S101, the UE can receive PUCCH resource assignment information from the network. The PUCCH resource assignment information may be the information carried by high-layer signaling (such as RRC signaling), and the RRC signaling can assign PUCCH resource assignment information for unlicensed spectrums to the UE.

Wherein, the PUCCH resource assignment information can include a PUCCH format, a PUCCH start symbol and length, a frequency position of the starting PRB in PUCCH, the number of frequency domain PRBs in PUCCH, code rate information, frequency hopping or not, and a frequency position of the second hopping PRBs in PUCCH if there is frequency hopping.

After receiving the PUCCH resource assignment information, the UE can determine a PUCCH format used for the uplink control information to be transmitted, and available RBs.

In step S102, when the UE determines that the PUCCH format for use is a PUCCH format requiring more than one physical resource block for resource transmission, where the format may be PUCCH format 2 or PUCCH format 3 or a PUCCH format with other forms of name, firstly the number of RBs required for transmitting the uplink control information can be determined according to assignment information by network; and thereafter, if the number of RBs that is required is larger than that assigned by the network and the uplink control information is transmitted in an unlicensed spectrum, when resource mapping the uplink control information, the UE can at least map the uplink control information to all frequency domain resources of the RBs assigned by the network, so as to meet the requirement in the European region that the occupation ratio in the uplink power in unlicensed spectrums must be greater than 80%.

As a non-limiting embodiment, in order to map the uplink control information to all frequency domain resources of the RBs assigned by the network, the UE can adjust the code rate of the PUCCH format requiring more than one physical resource block for resource transmission (e.g., PUCCH format 2 or PUCCH format 3), so that all the assigned RBs can be occupied.

To be specific, the UE can get from the network the PUCCH resource assignment information that includes a PUCCH format, a PUCCH start symbol and length, a frequency position of the starting PRB in PUCCH, the number of frequency domain PRBs in PUCCH, code rate information, frequency hopping or not, and a frequency position of the second hopping PRBs in PUCCH if there is frequency hopping.

In need of transmitting PUCCH over unlicensed spectrums, the UE enables PUCCH to occupy all the assigned RBs, by adjusting the actually adopted code rate in accordance with the number of bits of UCI and the PUCCH resource assignment information.

In specific implementations, if the PUCCH format assigned by the network to the UE is PUCCH format 2, it is assumed for PUCCH format 2 that the number of RBs assigned by RRC signaling is $M_{RB}^{PUCCH}$.

If $(O_{ACK}+O_{SR}+O_{CSI}+O_{CRC}) \leq M_{RB}^{PUCCH} \cdot N_{sc,ctrl}^{RB} \cdot N_{symb}^{PUCCH} \cdot Q_m \cdot r$, then the UE can select a minimum code rate $r_k$ which satisfies $$\begin{cases} (O_{ACK} + O_{SR} + O_{CSI} + O_{CRC}) \leq M_{RB}^{PUCCH} \cdot N_{sc,ctrl}^{RB} \cdot N_{symb}^{PUCCH} \cdot Q_m \cdot r_k \\ (O_{ACK} + O_{SR} + O_{CSI} + O_{CRC}) > M_{RB}^{PUCCH} \cdot N_{sc,ctrl}^{RB} \cdot N_{symb}^{PUCCH} \cdot Q_m \cdot r_{k-1} \end{cases}$$

Wherein, $O_{ACK}$ is a total number of bits of HARQ acknowledgement; $O_{SR}$ is a bit for scheduling request, if there is no bit for scheduling request, $O_{SR}=0$, or else $O_{SR}=1$; $O_{CSI}$ is a total number of bits reported by CSI; $O_{CRC}$ is a total number of bits for CRC; $N_{sc,ctrl}^{RB}$ is the number of subcarriers contained in RB, $N_{sc,ctrl}^{RB}=N_{sc}^{RB}-4=8$; $N_{symb}^{PUCCH}$ is the number of symbols in PUCCH format 2; $Q_m$ is a modulation order; r is a code rate assigned by high-layer signaling; and $r_k$ is the minimum code rate for occupying all the assigned resource blocks.

According to the above calculations, the UE can determine available code rates when all the assigned RBs are occupied with PUCCH format 2, select the minimum code rate $r_k$ from the available code rates, and determine the minimum code rate $r_k$ as the actual code rate. When transmitting with the actual code rate, the PUCCH transmitted by the UE can occupy all the assigned RBs including frequency domains and time domains, thereby meeting the requirement that the occupation ratio in the uplink power in unlicensed spectrums must be greater than 80%.

If a PUCCH format assigned by the network to the UE is PUCCH format 3, the UE calculates an actual code rate for the PUCCH format 3 in a similar way to that for the PUCCH format 2. As for the PUCCH format 3, the number of RBs assigned by high-layer signaling is still denoted by $M_{RB}^{PUCCH}$.

If $(O_{ACK}+O_{SR}+O_{CSI}+O_{CRC}) \leq M_{RB}^{PUCCH} \cdot N_{sc,ctrl}^{RB} \cdot N_{symb}^{PUCCH} \cdot Q_m \cdot r$, then the UE can select a minimum code rate $r_k$ which satisfies $$\begin{cases} (O_{ACK} + O_{SR} + O_{CSI} + O_{CRC}) \leq M_{RB}^{PUCCH} \cdot N_{sc,ctrl}^{RB} \cdot N_{symb}^{PUCCH} \cdot Q_m \cdot r_k \\ (O_{ACK} + O_{SR} + O_{CSI} + O_{CRC}) > M_{RB}^{PUCCH} \cdot N_{sc,ctrl}^{RB} \cdot N_{symb}^{PUCCH} \cdot Q_m \cdot r_{k-1} \end{cases}$$

Wherein, $N_{sc,ctrl}^{RB}$ is the number of subcarriers contained in RB, $N_{sc,ctrl}^{RB}=N_{sc}^{RB}=12$, $N_{symb}^{PUCCH}$ is the number of symbols in PUCCH format 3 other than DMRS; $Q_m$ is a modulation order; r is a code rate assigned by high-layer signaling; and $r_k$ is the minimum code rate for occupying all the assigned resource blocks.

According to the above calculations, the UE can determine available code rates when all the assigned RBs are occupied with PUCCH format 3, select the minimum code rate $r_k$ from the available code rates, and determine the minimum code rate $r_k$ as the actual code rate. When transmitting with the actual code rate, the PUCCH transmitted by the UE can occupy all the assigned RBs including frequency domains and time domains, thereby meeting the requirement that the occupation ratio in the uplink power in unlicensed spectrums must be greater than 80%.

As another non-limiting embodiment, the information in PRBs that have been subjected to resource mapping can be mapped repeatedly to idle PRBs. In other words, in need of transmitting PUCCH over unlicensed spectrums, the UE can map the UCI information to the assigned RBs according to the number of bits of the UCI and the PUCCH resource assignment information assigned by the network. If there are still idle PRBs after mapping, information in the mapped PRBs can be copied to idle RBs sequentially with an order from low RB frequency information to high RB frequency information (e.g., an order from small frequency index to large frequency index).

In specific implementations, the UE can get from the network the PUCCH resource assignment information that includes a PUCCH format, a PUCCH start symbol and length, a frequency position of the starting PRB in PUCCH, the number of frequency domain PRBs in PUCCH, code rate information, frequency hopping or not, and a frequency position of the second hopping PRBs in PUCCH if there is frequency hopping.

Thereafter, in need of transmitting PUCCH by the UE over unlicensed spectrums, a number of actually occupied PRBs $M_{RB,min}^{PUCCH}$ can be calculated based on the network assignment information in accordance with the number of bits of UCI and the PUCCH resource assignment information, and the resource mapping can be performed. If there are still idle PRBs after the resource mapping, then for the idle PRBs, information in the mapped PRBs can be copied to idle PRBs sequentially by the UE with an order from small frequency index to large frequency index.

Figure 3:
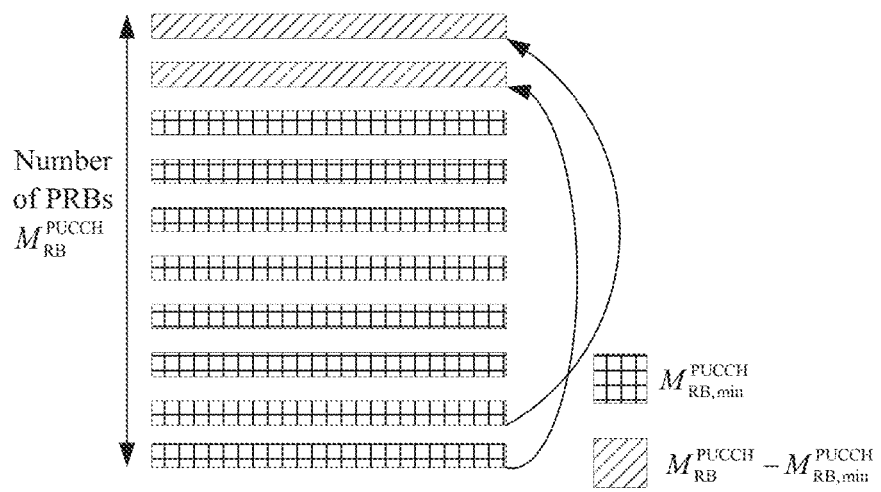
FIG. 3 is a schematic diagram of a resource mapping for PUCCH according to the embodiment shown in FIG. 2.

As shown in FIG. 3, in the case of $M_{RB,min}^{PUCCH} < M_{RB}^{PUCCH}$, there are ($M_{RB}^{PUCCH} - M_{RB,min}^{PUCCH}$) idle PRBs. Next, the UE can select ($M_{RB}^{PUCCH} - M_{RB,min}^{PUCCH}$) PRBs from low PRB to high PRB (e.g., from small PRB index to large PRB index), and copy the information in ($M_{RB}^{PUCCH} - M_{RB,min}^{PUCCH}$) mapped PRBs to the idle PRBs sequentially.

With the technical solution provided in the embodiments of the disclosure, all the time-frequency resources of RBs assigned by the network can be occupied, thereby meeting the requirement that the occupation ratio in the uplink power in unlicensed spectrums must be greater than 80%.

As yet another non-limiting embodiment, in order to map UCI information to all the frequency domain resources of the RBs assigned by the network, the UE may preferably perform the mapping on the frequency domain resources. Even if there are idle time domain symbols remained, the requirement that the occupation ratio of the uplink power in unlicensed spectrums is greater than 80% can still be met.

In specific implementations, the UE can get from the network the PUCCH resource assignment information that includes a PUCCH format, a PUCCH start symbol and length, a frequency position of the starting PRB in PUCCH, the number of frequency domain PRBs in PUCCH, code rate information, frequency hopping or not, and a frequency position of the second hopping PRBs in PUCCH if there is frequency hopping.

Figure 4:
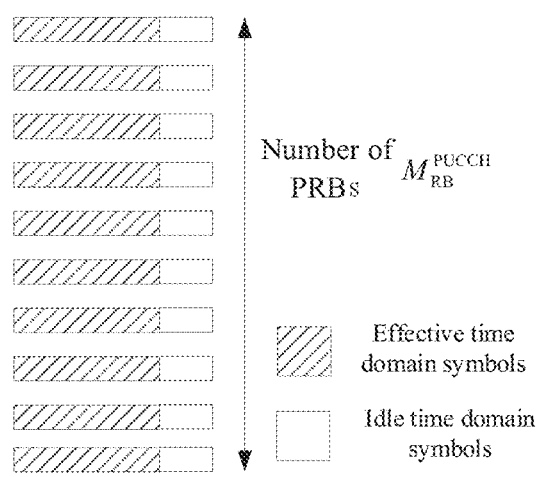
FIG. 4 is a schematic diagram of another resource mapping for PUCCH according to the embodiment shown in FIG. 2.

Thereafter, in need of transmitting UCI by the UE over unlicensed spectrums, a number of actually occupied PRBs $M_{RB,min}^{PUCCH}$ can be calculated based on the network assignment information in accordance with the number of bits of UCI and the PUCCH resource assignment information, and the resource mapping can be performed. As shown in FIG. 4, if there are still idle PRBs, the UE can map the uplink control information to all subcarriers of all the assigned RB resources firstly in frequency domain and then in time domain. Hence, with this technical solution, although there are idle time domain symbols when the UE transmits the UCI in unlicensed spectrums, the requirement that the occupation ratio of the uplink power in unlicensed spectrums must be greater than 80% can still be met.

As a variant embodiment, when the uplink control information is mapped to all the frequency domain resources of RBs assigned by the network, the UE may preferably perform the mapping to the frequency domain resources. Thereafter, if there are time domain symbols remained (i.e., idle time domain symbols), information in the mapped resource elements (RE) can be repeatedly mapped, to occupy all the remained time domain symbols, so as to meet the requirement that the occupation ratio of the uplink power in unlicensed spectrums must be greater than 80%.

In specific implementations, the UE can adopt the PUCCH resource mapping method as shown in FIG. 4. Firstly the UE can get from the network the PUCCH resource assignment information that includes a PUCCH format, a PUCCH start symbol and length, a frequency position of the starting PRB in PUCCH, the number of frequency domain PRBs in PUCCH, code rate information, frequency hopping or not, and a frequency position of the second hopping PRBs in PUCCH if there is frequency hopping.

Thereafter, in need of transmitting UCI by the UE over unlicensed spectrums, a number of actually occupied PRBs $M_{RB,min}^{PUCCH}$ can be calculated by the UE based on the network assignment information in accordance with the number of bits of UCI and the PUCCH resource assignment information, and the resource mapping can be performed to all subcarriers of all the $M_{RB}^{PUCCH}$ firstly in frequency domain and then in time domain.

Figure 5:
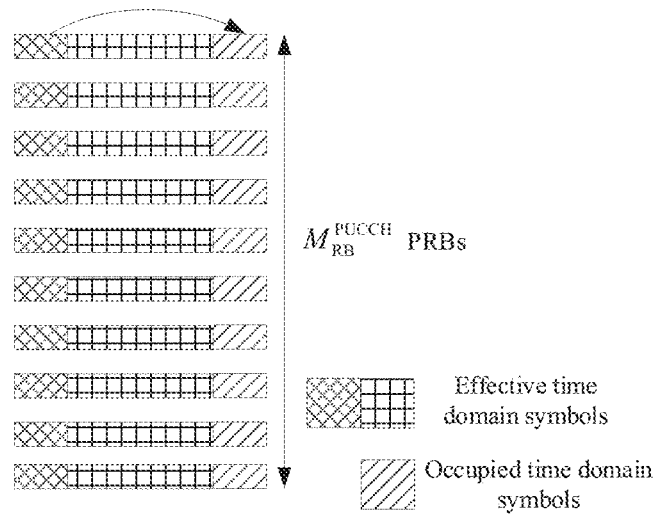
FIG. 5 is a schematic diagram of yet another resource mapping for PUCCH according to the embodiment shown in FIG. 2.

As shown in FIG. 5, if there are still idle time domain symbols, for PRBs with idle REs, the UE can copy the information in the mapped REs of the RBs to the idle REs in a time-domain sequence. As shown in FIG. 5, it is assumed that time domain resources contain fourteen time domain symbols in total, and in the case that all frequency domain subcarriers are occupied, only twelve time domain symbols are required for the actual transmission of each PRB, that is, twelve effective time domain symbols are required. At this moment, each PRB has two idle time domain symbols. If the information in the first two time domain symbols of each PRB is copied to the last two idle time domain symbols sequentially, all the time domain resources in the RBs assigned by the network can be occupied, to meet the requirement that the occupation ratio of the uplink power in unlicensed spectrums must be greater than 80%.

In view of the above, with the technical solution of the method provided in the embodiments of the present disclosure, it is attainable that when a PUCCH format requiring more than one physical resource block for resource transmission e.g., PUCCH format 2 or PUCCH format 3) is required for transmission in unlicensed spectrums, the occupation ratio of the uplink power thereof can be greatly improved, for example, the occupation ratio of the uplink power can be greater than 80%.

Figure 6:
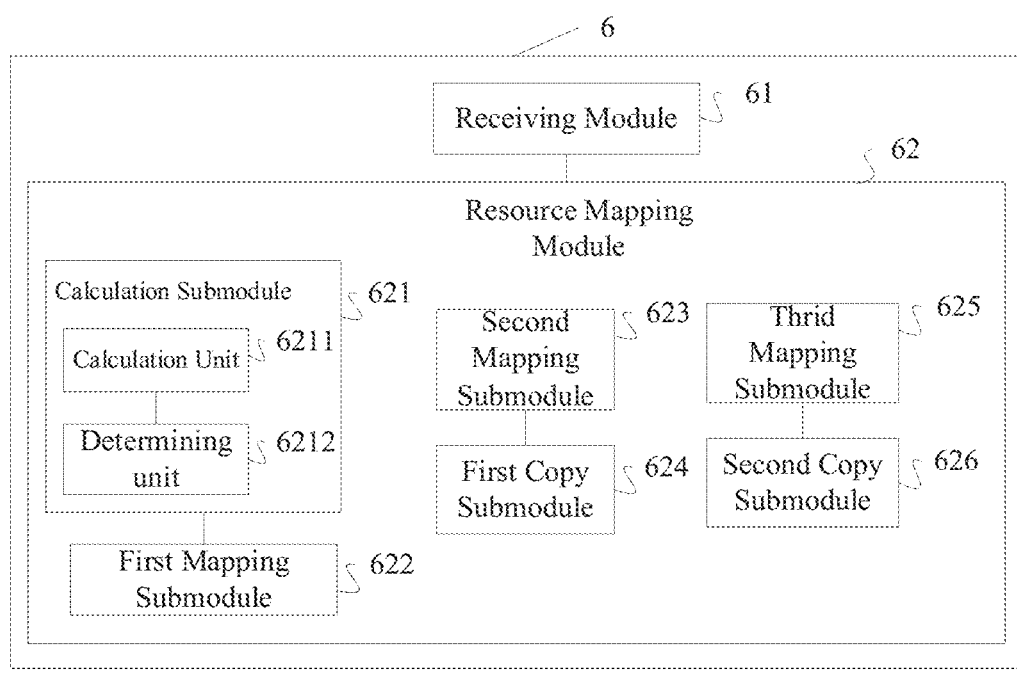
FIG. 6 is a structural diagram of a transmitting device for uplink control information according to an embodiment of the present disclosure.

FIG. 6 is structural diagram of a transmitting device for uplink control information according to the embodiment of the present disclosure, which is applicable on the UE side.

It is understandable to one of skill in the art that the transmitting device for uplink control information 6 (hereinafter referred to as the transmitting device 6) according to this embodiment can be used to implement the technical solution of the method in the embodiments as shown above in the FIGS. 1 to 5.

To be specific, the transmitting device 6 comprises: a receiving module 61 and a resource mapping module 62. More specifically, the receiving module 61 is adapted to receive PUCCH resource assignment information sent from a network to determine a PUCCH format and assigned resource blocks; and the resource mapping module 62 is adapted to resource map the uplink control information at least based on all frequency domain resources of the assigned resource blocks if the determined PUCCH format is one that requires more than one physical resource block for resource transmission and the number of the assigned resource blocks is larger than that required for transmitting the uplink control information.

As a non-limiting embodiment, the resource mapping module 62 may include a calculation submodule 621 and a first mapping submodule 622.

To be specific, the calculation submodule 621 is adapted to calculate an actual code rate required to occupy all the assigned resource blocks; and the first mapping submodule 622 is adapted to map the uplink control information to the assigned resource blocks according to the actual code rate.

Wherein, the calculation submodule 621 may include a calculation unit 6211 and a determining unit 6212.

Specifically, the calculation unit 6211 is adapted to calculate available code rates when the PUCCH format for use occupies all the assigned resource blocks; and the determining unit 6212 is adapted to determine a minimum code rate among the available code rates as the actual code rate.

As another non-limiting embodiment, the resource mapping module 62 may include a second mapping submodule 623 and a first copy submodule 624.

In specific implements, the second mapping submodule 623 is adapted to map the uplink control information to the assigned resource blocks; and the first copying submodule 624 is adapted to copy, if there are still idle resource blocks after the mapping, the uplink control information in the mapped resource blocks to the idle resource blocks sequentially with an order from a low resource block to a high resource block.

As yet another non-limiting embodiment, the resource mapping module 62 may include a third mapping submodule 625.

To be specific, the third mapping submodule 625 is adapted to map the uplink control information to all subcarriers of all the assigned resource blocks firstly in frequency domain and then in time domain, if the number of the assigned resource blocks is larger than that required for transmitting the uplink control information.

Preferably, the resource mapping module 62 may further comprise a second copy submodule 626.

In specific implements, the second copy submodule 626 is adapted to copy, for resource blocks with idle resource elements, information in the mapped resource elements in the resource blocks to the idle resource elements in a time-domain sequence.

Please refer to the above relevant descriptions with FIGS. 2 to 5 for more details of the working principle and working mode of the transmitting device 6 as shown in FIG. 6, which is not repeated here.

Furthermore, an embodiment of the present disclosure further discloses a storage medium storing computer instructions, wherein the computer instructions, when executed by a computer, cause the computer to perform the technical solution concerning the above transmitting method for uplink control information according to the embodiments as shown in above FIGS. 2 to 5. Preferably, the storage medium can comprise a computer readable storage medium such as a non-volatile memory and a non-transitory memory. The computer readable storage medium may include ROM, RAM, magnetic discs, optical discs, etc.

In addition, an embodiment of the present disclosure further discloses a user equipment, comprising a memory and a processor, wherein the memory stores computer instructions executable by the processor, and the processor, when executing the computer instructions, performs the technical solution concerning the above transmitting method for uplink control information according to the embodiments as shown in above FIGS. 2 to 5.

Although the present disclosure has been disclosed as above, it is not limited thereto. Various variations and modifications may occur to one of skill in the art without departing from the scopes and spirits of the present disclosure. Therefore, the protection scope of the present disclosure is subject to the scope defined by the claims.

What is claimed is:

1. A method for transmitting uplink control information, comprising:
   receiving physical uplink control channel (PUCCH) resource assignment information sent from a network to determine a PUCCH format and assigned resource blocks; and
   resource mapping the uplink control information at least based on all frequency domain resources of the assigned resource blocks, in response to the determined PUCCH format requiring more than one physical resource block for resource transmission and a number of the assigned resource blocks being larger than that required for transmitting the uplink control information.

2. The method according to claim 1, wherein said resource mapping the uplink control information at least based on all frequency domain resources of the assigned resource blocks comprises:
   calculating an actual code rate required to occupy all the assigned resource blocks; and
   mapping the uplink control information to the assigned resource blocks based on the actual code rate.

3. The method according to claim 2, wherein said calculating the actual code rate required to occupy all the assigned resource blocks comprises:
   calculating available code rates based on the determined PUCCH format occupying all the assigned resource blocks; and
   determining a minimum code rate among the available code rates as the actual code rate.

4. The method according to claim 1, wherein said resource mapping the uplink control information at least based on all frequency domain resources of the assigned resource blocks comprises:
   mapping the uplink control information to the assigned resource blocks; and
   based on an idle resource block after the mapping is completed, copying the uplink control information in the mapped resource blocks sequentially with an order from low to high to the idle resource block.

5. The method according to claim 1, wherein said resource mapping the uplink control information at least based on all frequency domain resources of the assigned resource blocks comprises:
   in response to the number of the assigned resource blocks being larger than that required for transmitting the uplink control information, mapping the uplink control information to all subcarriers of all the assigned resource blocks firstly in frequency domain and then in time domain.

6. The method according to claim 5, wherein said resource mapping the uplink control information at least based on all frequency domain resources of the assigned resource blocks further comprises:
   for a resource block with an idle resource element, copying information on the mapped resource element in the resource block to the idle resource element in a time-domain sequence.

7. An electronic device, comprising a memory and a processor, wherein the memory stores computer instructions cause the processor to:
   receive PUCCH resource assignment information sent from a network to determine a PUCCH format and assigned resource blocks; and
   resource map the uplink control information at least based on all frequency domain resources of the assigned resource blocks in response to the determined PUCCH format requiring more than one physical resource block for resource transmission and a number of the assigned resource blocks being larger than that required for transmitting the uplink control information.

8. The electronic device according to claim 7, wherein the computer instructions further cause the processor to:
   calculate an actual code rate required to occupy all the assigned resource blocks; and
   map the uplink control information to the assigned resource blocks based on the actual code rate.

9. The electronic device according to claim 8, wherein the computer instructions further cause the processor to:
   calculate available code rates based on the determined PUCCH format occupying all the assigned resource blocks; and
   determine a minimum code rate among the available code rates as the actual code rate.

10. The electronic device according to claim 7, wherein the computer instructions further cause the processor to:
    map the uplink control information to the assigned resource blocks; and
    based on an idle resource block after the mapping is complete, copy the uplink control information in the mapped resource blocks sequentially with an order from low to high to the idle resource block.

11. The electronic device according to claim 7, wherein the computer instructions further cause the processor to:
    map the uplink control information to all subcarriers of all the assigned resource blocks firstly in frequency domain and then in time domain, in response to the number of the assigned resource blocks being larger than that required for transmitting the uplink control information.

12. The electronic device according to claim 11, wherein the computer instructions further cause the processor to:
    for a resource block with an idle resource element, copy information in the mapped resource element in the resource block to the idle resource element in a time-domain sequence.

13. A non-transitory computer readable storage medium storing computer instructions, wherein the computer instructions, when executed by a computer, cause the computer to:
    receive physical uplink control channel (PUCCH) resource assignment information sent from a network to determine a PUCCH format and assigned resource blocks; and
    resource map the uplink control information at least based on all frequency domain resources of the assigned resource blocks, in response to the determined PUCCH format requiring more than one physical resource block for resource transmission and a number of the assigned resource blocks being larger than that required for transmitting the uplink control information.

* * * * *